United States Patent
Laing et al.

(10) Patent No.: US 8,550,719 B2
(45) Date of Patent: Oct. 8, 2013

(54) BEARINGS WITH UNCOATED CRUSH RELIEVES

(75) Inventors: Ian Laing, Rugby (GB); Stephane Barral, Saint Martin Bellevue (FR); Cedric Fortune, Annemasse (FR); Raphaelle Francois, Hauteville sur Fier (FR); Virginie Neyret, Cran Gevrier (FR); Lionel Menu, Meythet (FR)

(73) Assignees: MAHLE International GmbH, Stuttgart (DE); MAHLE Composants Moteur France SAS, Chavanod (FR); MAHLE Engine Systems UK Limited, Rugby, Warwickshire (GB)

( * ) Notice: Subject to any disclaimer, the term of this patent is extended or adjusted under 35 U.S.C. 154(b) by 0 days.

(21) Appl. No.: 13/637,132

(22) PCT Filed: Mar. 30, 2011

(86) PCT No.: PCT/EP2011/001587
§ 371 (c)(1),
(2), (4) Date: Sep. 25, 2012

(87) PCT Pub. No.: WO2011/120677
PCT Pub. Date: Oct. 6, 2011

(65) Prior Publication Data
US 2013/0016933 A1 Jan. 17, 2013

(30) Foreign Application Priority Data
Mar. 30, 2010 (GB) .................................. 1005299.1

(51) Int. Cl.
*F16C 9/02* (2006.01)
*F16C 33/02* (2006.01)
*B29D 33/00* (2010.01)

(52) U.S. Cl.
USPC ...................... 384/276; 384/294; 29/898.054

(58) Field of Classification Search
USPC ......... 384/273, 276, 286, 288, 291, 294, 428, 384/429, 430, 432, 434; 29/898.056, 29/898.057, 898.058, 898.059, 898.054; 427/453–456
See application file for complete search history.

(56) References Cited

U.S. PATENT DOCUMENTS

| 4,599,147 A | 7/1986 | Thompson |
| 5,433,531 A * | 7/1995 | Thompson .................... 384/276 |

(Continued)

FOREIGN PATENT DOCUMENTS

| EP | 1 652 953 | 5/2006 |
| GB | 2338995 | 1/2000 |
| JP | 5-071538 | 3/1993 |

(Continued)

OTHER PUBLICATIONS

International Search Report and Written Opinion of the International Searching Authority of PCT/EP2011/001587, Jun. 1, 2011. British Search Report dated Jul. 29, 2010 in British Application No. 1005299.1.

*Primary Examiner* — Phillip A Johnson
(74) *Attorney, Agent, or Firm* — Collard & Roe, P.C.

(57) ABSTRACT

There is disclosed a split bearing comprising a semi-cylindrical bearing member having a concave bearing surface extending throughout the length thereof to a parting face at each opposed circumferential end of the bearing member. The bearing surface has formed thereon a sprayed bearing overlay extending over the whole bearing surface except for crush relief regions adjacent to the parting faces. The bearing member has a substantially constant outer diameter and inner diameter except at the crush relief regions, where the inner diameter is larger than at other regions of the bearing surface. There is also disclosed a method of making such a bearing. Less overlay material is required than in conventional split bearings.

11 Claims, 3 Drawing Sheets

(56) References Cited

U.S. PATENT DOCUMENTS

| | | | | |
|---|---|---|---|---|
| 5,551,782 A | * | 9/1996 | Arnhold et al. | 384/294 |
| 6,273,612 B1 | * | 8/2001 | Ono et al. | 384/276 |
| 7,234,870 B2 | * | 6/2007 | Kitahara et al. | 384/288 |
| 7,572,060 B2 | * | 8/2009 | Kuroda et al. | 384/276 |
| 2005/0196084 A1 | * | 9/2005 | Kitahara et al. | 384/288 |

FOREIGN PATENT DOCUMENTS

| | | |
|---|---|---|
| WO | WO 99/47723 | 9/1999 |
| WO | WO 2006/035220 | 4/2006 |

* cited by examiner

BEARINGS WITH UNCOATED CRUSH RELIEVES

CROSS REFERENCE TO RELATED APPLICATIONS

This application is the National Stage of PCT/EP2011/001587 filed on Mar. 30, 2011, which claims priority under 35 U.S.C. §119 of Great Britain Application No. 1005299.1 filed on Mar. 30, 2010, the disclosure of which is incorporated by reference. The international application under PCT article 21(2) was published in English.

The present invention relates to bearings, materials for bearings and to a method for the production thereof.

BACKGROUND

Bearings used in modern engines need to possess a combination of often conflicting properties. Bearings generally comprise several layers: a backing layer of a strong material such as steel or bronze having a thickness in the range from about 1 to about 10 mm; a layer of a bearing alloy usually based upon alloys of copper or aluminium and having a thickness in the range from about 0.1 to about 1 mm; and, optionally, a so-called overlay layer on top of the bearing alloy layer and having a thickness in the range from about 5 to about 50 µm. There may also be additional layers: one situated between the backing and the bearing alloy layer to assist in enhancing adhesion between these two layers and comprising, for example, a thin layer (generally about 5 to 50 µm, although much thicker layers up to about 300 µm have been known) of aluminium or an aluminium alloy, nickel or another material as are known in the art. A further layer, a so-called interlayer, may be situated between the bearing alloy layer and the overlay layer and be present for the purpose of enhancing adhesion between the two layers and/or acting as a barrier to prevent or minimise unwanted diffusion of alloying constituents between the two layers. Such interlayers are usually very thin, of the order of about 0.5 to 5 µm.

Where present, the overlay layer provides the actual running or sliding surface between the bearing itself and a cooperating shaft journal. The overlay is generally a relatively soft material being based upon alloys having tin, lead, cadmium or aluminium as their main constituent. The purpose of the overlay, which is generally softer than the bearing alloy layer, is to provide a conformable layer able to accommodate small misalignments between the bearing and shaft journal caused due to imperfections in the machining processes involved in the bearing and engine manufacturing processes, i.e. the overlay possesses the characteristic of conformability. The overlay layer must also be seizure resistant, fatigue resistant, corrosion resistant; wear resistant and provide for embeddability of dirt and debris carried in the lubricating oil. Good fatigue resistance and wear resistance are generally associated with high strength and hardness. Good seizure resistance requires the material forming the running surface to have good compatibility which overlay alloys, due to their composition, generally possess. Similar requirements are also associated with the bearing alloy layer where no overlay is present and the bearing alloy itself forms the actual running or sliding surface. However, it should be borne in mind that in some engines, due to the arduous service conditions, it is common for the overlay layer to be worn away on at least part of the sliding surface (generally in a loaded area) thereby exposing the underlying bearing alloy layer which then becomes the actual sliding or running surface.

It is known, for example from WO 99/47723 and WO 2006/035220, the full contents of which are hereby incorporated into the present application by reference, to provide bearing alloy layers and overlay coating layers based on aluminium and alloys thereof by way of a High Velocity Oxy-Fuel (HVOF) spraying process.

It is also known, when manufacturing split bearings generally comprising two semi-cylindrical half shells which are intended for assembly around a journal member (such as a crankshaft) or a slide member (such as a push rod or connector rod), to provide a bore relief or crush relief portion (hereinafter referred to generally as a crush relief) along the inner longitudinal edges of the half shells. The crush relief, which takes the form of a narrowing of the wall of the bearing half shell in a region adjacent to the parting face of the bearing, is generally formed by removing part of the bearing lining by a machining process, such as high speed boring. A typical example of a split journal bearing having crush relieves is disclosed in US 2005/0196084, the full content of which is hereby incorporated into the present application by reference. The crush relief is provided on the bearing surface of split journal bearings to accommodate any slight deformation or misalignment caused when the two bearing half shells are forced into engagement.

With reference to FIG. 1, It is known to manufacture a bearing half shell 1 by starting with a generally rectangular hard metal (e.g. steel or other hard alloy) blank with a softer layer of a bearing alloy such as a copper-based material formed thereon. The blank is then pressed or stamped so as to deform it into the required semi-cylindrical shape, with the softer layer of the bearing alloy 3 forming the interior lining surface of the half shell thus formed, and the harder metal 2 of the substrate forming the outer surface. The half shell 1 is then subjected to an initial rough machining, followed by more precise boring to a precise thickness, including the formation of crush relief portions 4. The crush relieves 4 are formed in the bearing lining 3, which means that the bearing lining 3 will be thinner in the region of the crush relieves 4 than elsewhere on the lining surface. An overlay 5 is then sprayed onto the interior surface of the half shell by way of an HVOF process, with the thickness of the overlay 5 being relatively constant over the whole interior surface. The half shell 1 is then subjected to final machining and boring, including the crush relief portions 4, to remove a top surface 6 of the overlay 5, leave a bearing half shell with the precise bore thickness and crush relief dimensions that are required, and a generally smooth bearing surface 6. It will be noted that, even after final machining and boring, the entire exposed bearing surface 6 will be comprised of the overlay 5 applied by HVOF spraying.

FIG. 2 shows, in schematic form and without identifying the layers, a section of the half shell 1 with an outer backing surface 7 having an outer diameter dimension $D_{outer}$ with respect to a longitudinal axis of the half shell and an inner bore surface 8 having an inner diameter dimension $D_{inner}$ smaller than the outer diameter dimension $D_{outer}$. The crush relief 4 is formed separately, and has a crush relief dimension d defined by the depth of the overlay removed at the joint face 9.

BRIEF SUMMARY OF THE DISCLOSURE

According to a first aspect of the present invention, there is provided a method of making a split bearing including the steps of:
i) forming a metal strip into a semi-cylindrical bearing member having a concave bearing surface extending throughout the length thereof to a parting face at each opposed circumferential end of the bearing member;

ii) applying a bearing overlay to a majority of the bearing surface by way of a spraying process, but not applying the overlay to regions of the bearing surface adjacent to the parting faces;

iii) machining crush relief portions at the regions of the bearing surface adjacent to the parting faces, the crush relief portions being free of the bearing overlay.

The metal strip is typically rectangular or oblong in shape before being formed into a semi-cylindrical bearing member. The strip may comprise a steel or other hard metal or alloy as a backing material, with a softer bearing lining material, such as a bronze or the like, formed on one side. In some processes, the bearing lining may be sprayed or formed by CVD or PVD or electroplated onto the backing material before the strip is formed into a semi-cylindrical bearing member, or after. More typically, the lining is applied to the backing material in strip form by sintering and rolling, or by continuous casting (with subsequent machining, rolling and annealing steps as required). It is also possible to use "mono-metal" strips made out of special bearing materials, such as some bronzes, that have both the mechanical strength and tribological properties required for a bearing without the need for two (or more) separate layers. However, the high cost of such materials can be disadvantageous.

In preferred embodiments, the bearing overlay is metallic, for example an alloy-based metal matrix, which is applied by a metal spraying process. High velocity oxy-fuel (HVOF) spraying is a particularly useful technique in this regard, and can be used, for example, with aluminium and aluminium alloy overlay materials. Bearing overlay alloys that have been found to be particularly useful include AlSn20Cu, AlSn20Mg3, AlSn6Si2CuNiMnV, AlSn12Cu and AlSn40Cu. For HVOF spraying, the overlay alloy materials are provided in the form of powder before being fed into an HVOF spraying gun.

Alternatively or in addition, other overlay materials, such as polymers may be used. It will be appreciated that HVOF spraying is not appropriate for polymers, and a conventional spray gun may be used.

Because the bearing surface in the crush relief regions of the finished bearing does not bear a significant load during normal use, it is possible to omit coating this region with the bearing overlay, which is often a relatively expensive material. Accordingly, when manufacturing bearings in bulk, there will be a significant saving in materials and energy over time, which is both economically and environmentally advantageous. Moreover, by reducing the surface area that needs to be covered, the number of passes of the spray gun, or the total distance travelled by a nozzle of the spray gun, can be reduced, thereby reducing the time needed for manufacture. Even small time savings can lead to significant cost reductions and improvements in efficiency in a bulk manufacturing process.

Moreover, in contrast to previous methods in which the crush relief portion is machined prior to spray application of the overlay, and then machined a second time after spray application of the overlay when reducing the overlay thickness to leave a smooth bearing surface, there is only one machining step required to form the crush relief portions. This results in quicker manufacture.

In the method of preferred embodiments of the present invention, a number of semi-cylindrical bearing members are shaped from metal blanks and, where required, subjected to initial rough machining before being sprayed with the overlay. In order to apply the overlay, a number of the semi-cylindrical bearing members are aligned about a common axis with their concave bearing surfaces facing the same way. A robot arm may then be used to spray on the overlay. By programming the robot arm appropriately, it is possible to control with reasonable precision where the overlay is applied, which allows the regions of the concave bearing surfaces adjacent to the joint faces to be kept substantially free of overlay without the need to mask these regions. This is in contrast to methods in which an overlay is electroplated onto the bearing surfaces, where a dielectric mask has to be applied before plating to avoid deposition of the overlay where it is not desired or needed. It is worth noting that other deposition processes such as PVD, CVD and sputtering also require masking of an underlying substrate in order to allow regions free of overlay to be formed.

According to a second aspect of the present invention, there is provided a split bearing comprising a semi-cylindrical bearing member having a concave bearing surface extending throughout the length thereof to a parting face at each opposed circumferential end of the bearing member, the bearing surface having formed thereon a sprayed bearing overlay extending over the whole bearing surface except for crush relief regions adjacent to the parting faces, and wherein the bearing member has a substantially constant outer diameter and inner diameter except at the crush relief regions, where the inner diameter is larger than at other regions of the bearing surface.

BRIEF DESCRIPTION OF THE DRAWINGS

Embodiments of the invention are further described hereinafter with reference to the accompanying drawings, in which.

DETAILED DESCRIPTION

Figure 1:
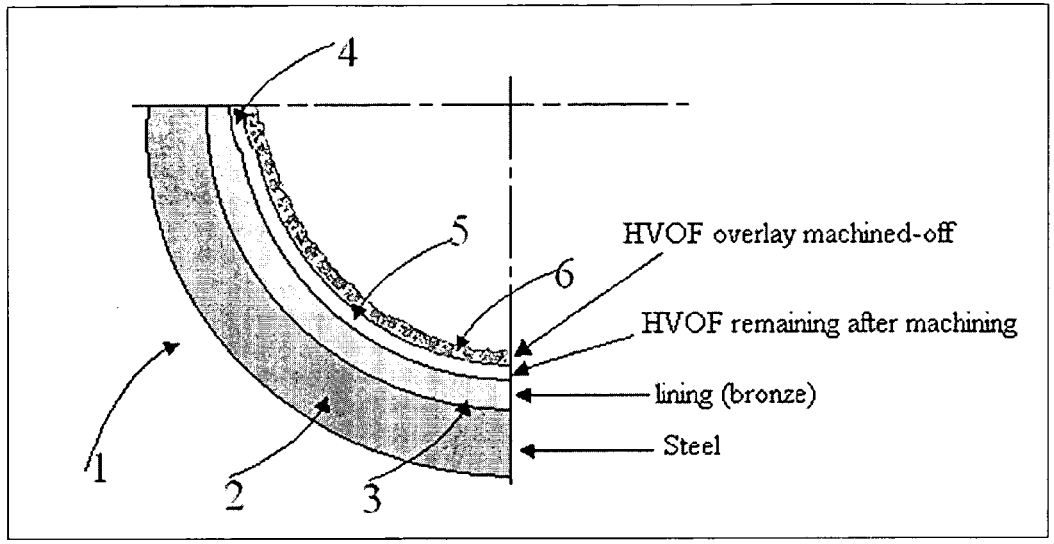
FIG. 1 shows a section through a prior art split bearing.
Figure 2:
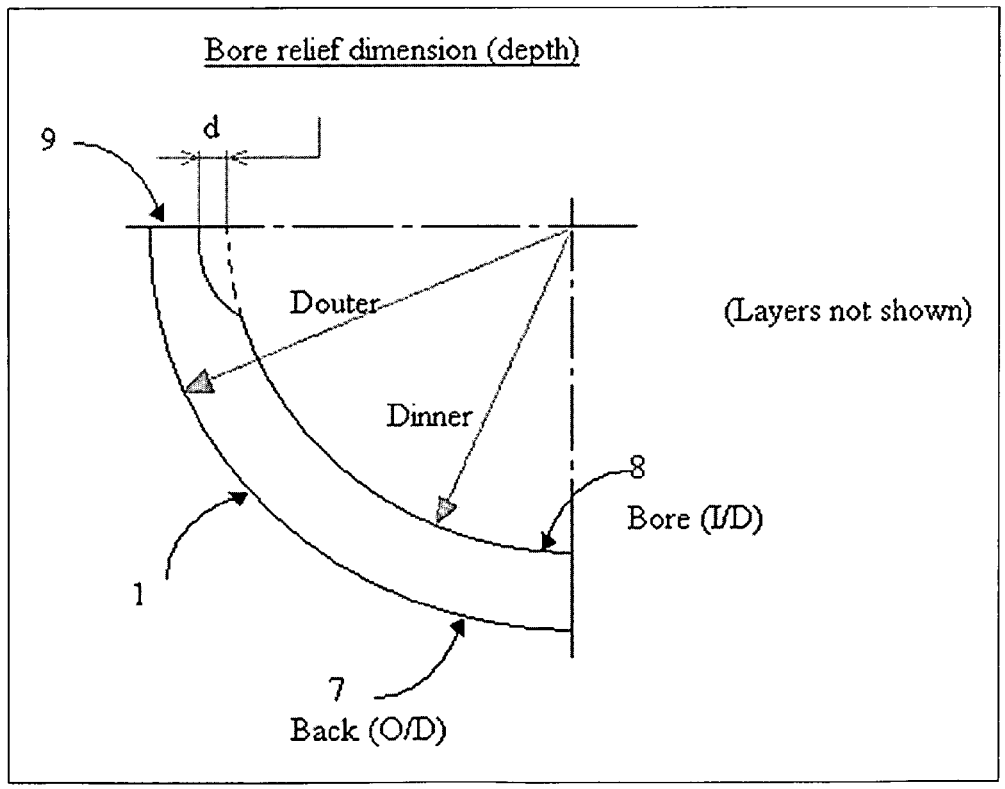
FIG. 2 shows in schematic form a frame of reference for characterising the dimensions of a split bearing.
Figure 3:
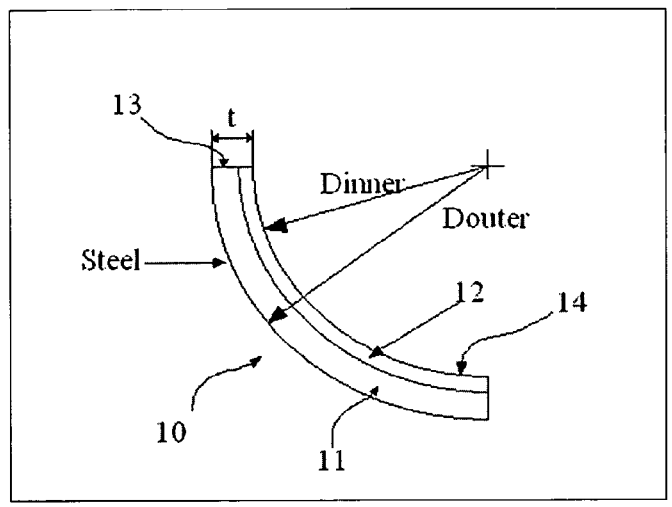
FIG. 3 shows a first step in a method of forming a split bearing of the present invention.
Figure 4:
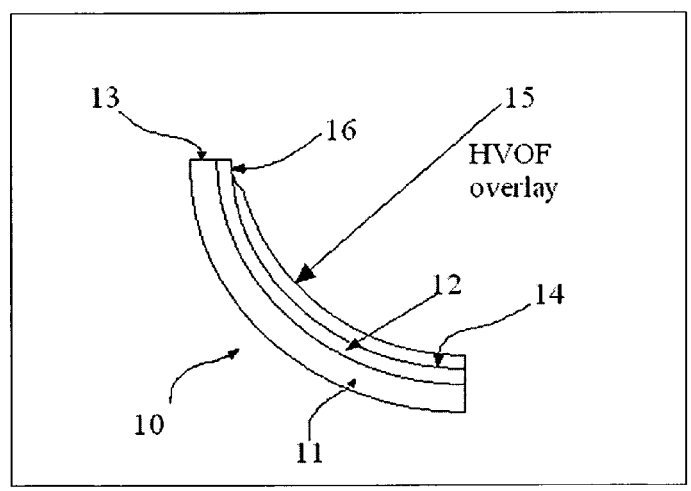
FIG. 4 shows a second step in a method of forming a split bearing of the present invention.
Figure 5:
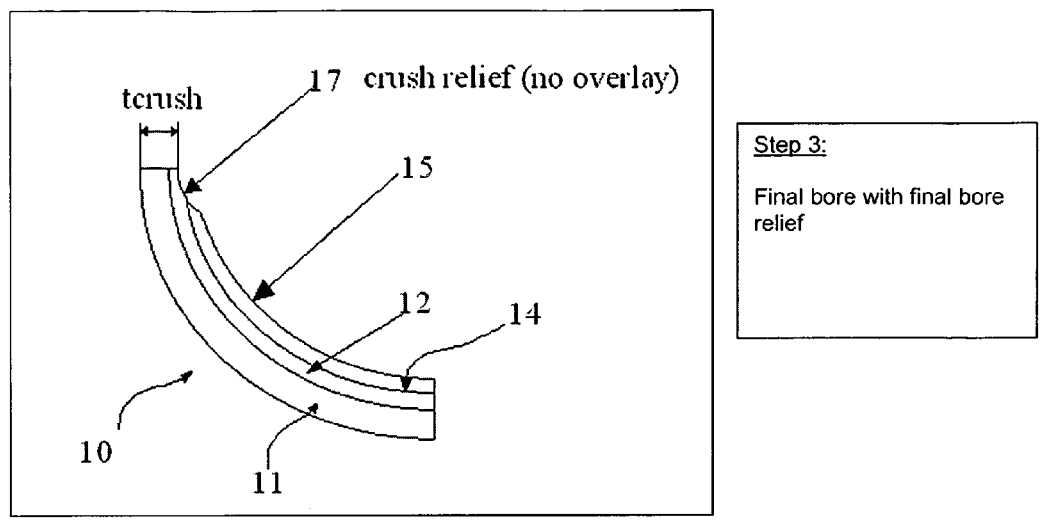
FIG. 5 shows a third step in a method of forming a split bearing of the present invention.

A particularly preferred embodiment of the present invention is illustrated in FIGS. 3 to 5, which show cross-sections through a split bearing (only half of the bearing is shown, since it is generally symmetrical) at three stages in its manufacture.

As shown in FIG. 3, a semi-cylindrical bearing member 10 comprises a steel or other hard metal outer backing layer 11 and a softer bronze or other bearing alloy lining layer 12 formed into a semi-cylindrical half shell. The bearing member 10 is subjected to a boring operation so as to ensure compliance with the desired size and shape, with the wall thickness:

$$t = D_{outer} - D_{inner}$$

being substantially constant through 180° as measured about the central axis from one parting face 13 to the other (not shown). The bearing member has an inner surface 14.

A bearing alloy, such as an aluminium alloy (e.g. AlSn20Cu, AlSn20Mg3, AlSn6Si2CuNiMnV, AlSn12Cu, AlSn40Cu or others), is then applied to the inner surface 14 by way of an HVOF process using a sprayer mounted on a robot arm. The sprayer is supplied with an aluminium alloy powder, as is known to those of ordinary skill in the art, which is then heated and partially melted in a flame at the same time as being accelerated towards the inner surface 14 in a gas jet. This results in the build up of a thick, dense overlay coating 15 on the inner surface 14, as shown in FIG. 4. However, no overlay is deliberately sprayed onto regions 16 of the inner surface 14 adjacent to the parting faces 13. This is done by suitable control of the robot arm. There is no need to mask the regions 16 prior to spraying. It will be appreciated that a small degree of overspray may occur, and that some particles of overlay will find their way onto the regions 16, but this is of little consequence given that these regions 16 are subsequently re-bored or machined and the waste of bearing overlay alloy will be minimal.

Subsequently, the inner surface of the bearing member 10 is machined again, generally by a boring operation, to remove a topmost layer of the overlay coating 15 (thereby rendering it smooth after the spraying process), and crush relieves 17 are formed adjacent to the parting faces 13 at the same time. The crush relieves 17 in this embodiment require removal of a small amount of the lining layer 12 in the regions 16, and do not include any of the overlay coating 15. The boring operation allows a smooth transition from the overlay coating 15 to the lining layer 12 to be configured. It will be seen that the wall thickness $t_{crush}$ in the region of the crush relieves 17 is less than the original wall thickness t in FIG. 3.

Embodiments of the present invention allow less overlay material (typically an expensive alloy powder) to be used, and may also involve one less machining step (the crush relieves are only formed after spraying), or at least less tooling and machine set up times than in conventional methods.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of making a split bearing including the steps of:
   i) forming a metal strip into a semi-cylindrical bearing member having a concave bearing surface extending throughout the length thereof to a parting face at each opposed circumferential end of the bearing member;
   ii) applying a bearing overlay to a majority of the bearing surface by way of a spraying process, but not applying the overlay to regions of the bearing surface adjacent to the parting faces;
   iii) machining crush relief portions at the regions of the bearing surface adjacent to the parting faces, the crush relief portions being free of the bearing overlay.

2. The method according to claim 1, wherein the bearing overlay is a bearing alloy.

3. The method according to claim 1, wherein the spraying process is high velocity oxy-fuel spraying.

4. The method according to claim 1, wherein the bearing overlay is a polymer.

5. The method according to claim 1, wherein the bearing member is machined to a substantially constant wall thickness before the bearing overlay is applied.

6. The method according to claim 1, wherein the regions of the bearing surface adjacent to the parting faces are not masked during the spraying process.

7. A split bearing comprising a semi-cylindrical bearing member having a concave bearing surface extending throughout the length thereof to a parting face at each opposed circumferential end of the bearing member, the bearing surface having formed thereon a sprayed bearing overlay extending over the whole bearing surface except for crush relief regions adjacent to the parting faces, and wherein the bearing member has a substantially constant outer diameter and inner diameter except at the crush relief regions, where the inner diameter is larger than at other regions of the bearing surface.

8. The split bearing as claimed in claim 7, wherein the bearing overlay is a bearing alloy.

9. The split bearing as claimed in claim 7, wherein the bearing overlay is a polymer.

10. The split bearing as claimed in claim 7, wherein the bearing member comprises a hard metal backing layer and a softer metal lining layer, and wherein the lining layer is exposed in the crush relief regions.

11. The split bearing as claimed in claim 10, wherein a transition between the overlay and the lining layer at the crush relief regions is not stepped.

* * * * *